T861058

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1357

773,655

PROCESS OF SWEETENING AND STABILIZING SULFATE GRADE TURPENTINE

Donald A. Maxwell and Bobby N. Scoggins, both % Tennessee Eastman Co., P.O. Box 511, Kingsport, Tenn. 37662

Filed Nov. 5, 1968. Published Apr. 29, 1969

Int. Cl. C09f *3/00*

U.S. Cl. 260—675.5

No Drawing. 10 Pages Specification

Process for sweetening and stabilizing sulfate-grade turpentine with a phenylene diamine inhibitor such as N,N'-disecondary-butyl-paraphenylene diamine, N,N'-disecondary-butyl-ortho-phenylene diamine and mixtures thereof. The turpentine is mixed with 10–150 p.p.m. inhibitor and 5–25% of 10–25° Baumé aqueous caustic. The mixture is agitated vigorously for 10–30 minutes, aged for 20–100 hours at 75–150° F., then separated. The hydrocarbon layer is an acceptable turpentine of good color, free of objectionable odor, and stable to oxidative deterioration.